United States Patent [19]
Alvarez Alvarez

[11] Patent Number: 5,608,802
[45] Date of Patent: Mar. 4, 1997

[54] DATA CIPHERING DEVICE

[75] Inventor: Manuel J. Alvarez Alvarez, Madrid, Spain

[73] Assignee: Alcatel Standard Electrica S.A., Madrid, Spain

[21] Appl. No.: 364,126

[22] Filed: Dec. 27, 1994

[30]     Foreign Application Priority Data

Dec. 31, 1993  [ES]  Spain ..................................... 9302742

[51] Int. Cl.$^6$ ....................................................... H04L 9/00
[52] U.S. Cl. ................................ 380/50; 380/28; 380/49
[58] Field of Search ................................... 380/28, 50, 9, 380/49, 4

[56]              References Cited

U.S. PATENT DOCUMENTS 4,188,506  2/1980  Schmid et al. ............................. 380/50

*Primary Examiner*—David C. Cain
*Attorney, Agent, or Firm*—Ware, Fressola, Van Der Sluys & Adolphson

[57]              ABSTRACT

A data ciphering device that has special application in implementing the Digital European Cordless Telephone (DECT) standard data ciphering algorithm which requires a lengthy procedure of key loading and logic operations during the stages of pre-ciphering and ciphering which require clocks operating at different frequencies. The device performs parallel mode loading of the shift registers, with a ciphering keyword. It also calculates, in a first cycle, during the pre-ciphering, the values of the bits of each shift register that determine the value of the next shift in order to, in a second cycle, effect parallel mode shifting in these registers with a value equal to the sum of the two previous shift values. During the ciphering process, the shifting is done in the registers, in parallel mode and in a single data clock cycle, with a value equivalent to the serial value obtained by the algorithm.

5 Claims, 3 Drawing Sheets

DATA CIPHERING DEVICE

TECHNICAL FIELD

This invention concerns an implementation of the data ciphering algorithm used in the Digital European Cordless Telephone (DECT) standard for cordless telephone which permits a major saving in the electrical current consumption of the integrated circuit that incorporates it.

It is of particular application in cordless telephones where the current consumption is a very important feature to be considered when determining the duration of the batteries and consequently the terminal's autonomy.

BACKGROUND OF THE INVENTION

The DECT ciphering algorithm, like most data ciphering algorithms, make use of generators of pseudorandom sequences of a certain length developed from primitive polynomials.

In this case, there are four sequence generators implemented with four shift registers with intermediate feedback signals of the type known as Gallois, with lengths of 17, 19, 21 and 23 stages respectively, that perform a variable number of shifts for each data clock cycle and from which a memory bit is obtained that is a logical combination of some of the bits of the shift registers mentioned and of the previous value of this memory bit.

The complete ciphering process is divided functionally into three stages:

Loading the keywords. A keyword of 128 bits has to be introduced through the input of the four shift registers which start from an initial state of all bistables set to zero, so that by the end of this process each register has a combination of ones and zeros determined by this keyword, and which is the state from which the algorithm independently starts to generate a pseudorandom data sequence that determines the ciphering of the input data.

Pre-ciphering. In this stage the input to the registers has no effect but their content, obtained in the previous stage, is shifted a number of times during eleven data clock cycles; this number can be 2 or 3 depending on Boolean logic functions of certain determined bits of the four registers defined by the algorithm. When these 11 cycles have elapsed, a check is made to see if the content of the registers is zero, in which case the input bit of the corresponding register is set to one and the same process is repeated as has been described above for another 29 data clock cycles. Up to this point a series of prior operations have taken place in the shift registers, but the ciphering itself has not started.

Ciphering. In this stage logic functions are performed with certain bits from the shift registers and with a memory bit which is the output bit of these logic operations in the preceding data clock period. The bit obtained as a result of these logic functions is combined in an exclusive-OR logic operation with the data that are to be encoded, so obtaining the data ciphered according to the DECT ciphering algorithm.

As prescribed by the algorithm, it is necessary to use 128 clock cycles of the sequence generator to load the keyword into the shift registers and 120 cycles more of the same clock to effect the pre-ciphering. The foregoing supposes that if the data clock is used as the sequence generator clock, a time equivalent to 248 data bits would be required to carry out the prior part before starting to generate ciphered output data.

Moreover, during the real ciphering stage, the need to perform 2 or 3 shift operations in the sequence generators to obtain a ciphered output bit which is combined with the input data bit and thereby achieve one ciphered data bit, implies the use of clocks working at frequencies 2 and 3 times greater than the data clock in order to maintain the timings correct during this ciphering process.

To reduce the times necessary to load the keyword and perform the pre-ciphering, it is common practice to make use of a higher frequency clock that permits both processes to be carried out in a shorter time whereby, the greater the frequency of this clock the shorter the time required to carry it out. However, the high frequencer clock causes, the current consumption to be greater. To reach a compromise between the two effects, a clock is normally used that is about ten times faster than the data clock and which shortens the aforementioned process times but does not produce an excessive increase in current consumption.

For the ciphering stage, as has already been mentioned, use is made of two clocks working at, respectively, 2 and 3 times the frequency of the data since, on some occasions, it will be necessary to shift a register twice per data bit period, and on others, three times.

As a consequence of this, not only the current consumption, which in the case of a DECT cordless terminal can be critical, is slightly increased but it also implies a need to have different clock signals which, in turn, must be generated from a single multiple frequency oscillator common to all of these clocks, in order to obtain the different clock frequencies by divisions of the output frequency from this oscillator.

TECHNICAL PROBLEM TO BE OVERCOME

As a consequence of the state of the art outlined above, the technical problem lies in reducing the current consumption in the integrated circuit that implements the algorithm mentioned without lengthening the process time necessary to perform the constituent phases of loading the keyword and pre-ciphering, and maintaining the appropriate timings for correctly executing the ciphering of the input data bits.

SUMMARY

The data ciphering device according to the invention is characterised in that all its registers and bistables work with a cadence determined by the data clock frequency.

It is also characterised in that the process of loading the four shift registers with the ciphering keyword takes place in parallel mode by means of corresponding parallel load calculating circuits that, respectively, respond to the following expressions:

$$R1_{n+p} = R1_n \times (T1)^p + U1'_n;$$

$$R2_{n+p} = R2_n \times (T2)^p + U2'_n;$$

$$R3_{n+p} = R3_n \times (T3)^p + U3'_n;$$

$$R4_{n+p} = R4_n \times (T4)^p + U4'_n;$$

where, $R1_{n+p}$, $R2_{n+p}$, $R3_{n+p}$ and $R4_{n+p}$ are the new values the registers would have after p clock cycles in the serial load mode, $(T1)^p$, $(T2)^p$, $(T3)^p$ and $(T4)^p$ are the transfer matrices corresponding to each generating polynomial but raised to the power p, and $U1'_n$, $U2'_n$, $U3'_3$ are the input vectors formed by the same number of consecutive bits of the keyword as is the length of the corresponding register and shifted p bits by each clock cycle.

Another characteristic is that during the pre-ciphering process, in a first cycle, a calculation is made in parallel mode and by means of corresponding parallel shift combinational circuits, of the value of the bits in each shift register, which permits the determination of the value of the next shift, and in a second cycle, starting from the previous values in the shift registers, also in parallel mode, the serial shift is made equivalent to the sum of the two consecutive shift values obtained previously.

Finally, in the ciphering process and in order to obtain, by means of a logic function performed in an output logic circuit, the output ciphering bit that will subsequently be combined in an exclusive-OR gate with the input data in order to obtain the ciphered output data, a parallel mode operation is done in a single clock period consisting of the equivalent serial shift of the shift registers corresponding to the value obtained according to the algorithm by means of the individual combinational shift circuits.

BRIEF DESCRIPTION OF THE DRAWINGS

A a fuller explanation is given of the invention based on the figures attached, in which.

BEST MODE FOR CARRYING OUT THE INVENTION

As was stated earlier, the DECT ciphering algorithm requires four shift registers R1, R2, R3 and R4 that implement the same number of pseudorandom sequence generators by means of certain intermediate feedback signals specified by the primitive polynomials of the algorithm in question.

Figure 1:
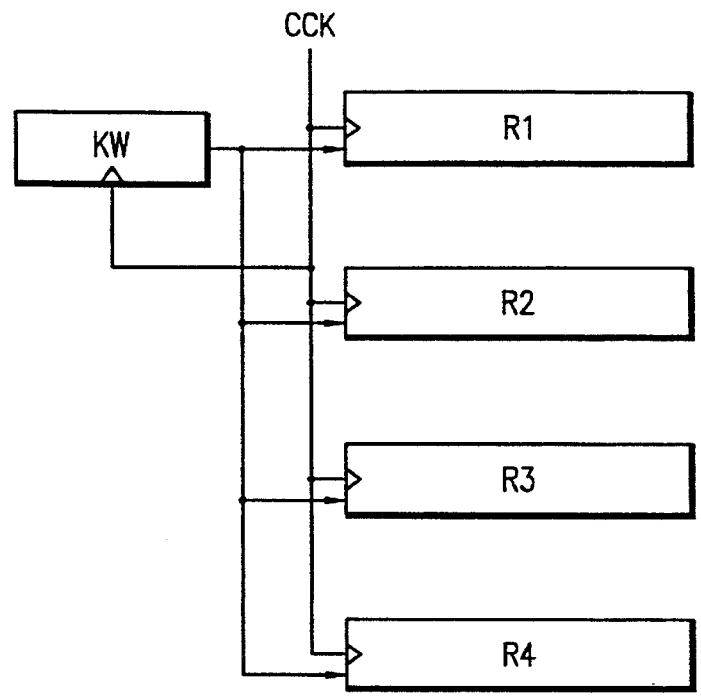
FIG. 1 shows a block diagram of the register loading process according to the state of the art, FIG. 2 also shows a block diagram for the register loading process according to the invention.

The loading of the keyword that is located in a keyword register KW would take place sequentially as shown in FIG. 1 in which the keyword bits Are introduced sequentially with loading clock CCK into the first bistable of each of the shift registers R1, R2, R3 and R4 until the 128 bits that form the keyword have been completed. If the contents of the respective registers at an instant n are termed $R1_n$, $R_n$, $R3_n$ and $R4_n$, then in the following clock cycle n+1, these contents will be:

$R1_{n+1} = R1_n \times T1 + U1_n$;

$R2_{n+1} = R2_n \times T2 + U2_n$;

$R3_{n+1} = R3_n \times T3 + U3_n$;

$R4_{n+1} = R4_n \times T4 + U4_n$;

where T1, T2, T3 and T4 are the corresponding transfer matrices of each sequence generator and $U1_n$, $U2_n$, $U3_n$ and $U4_n$ are the input vectors, the first element of which is the bit entering the first bistable of the registers and the rest of the elements are zero.

Figure 2:
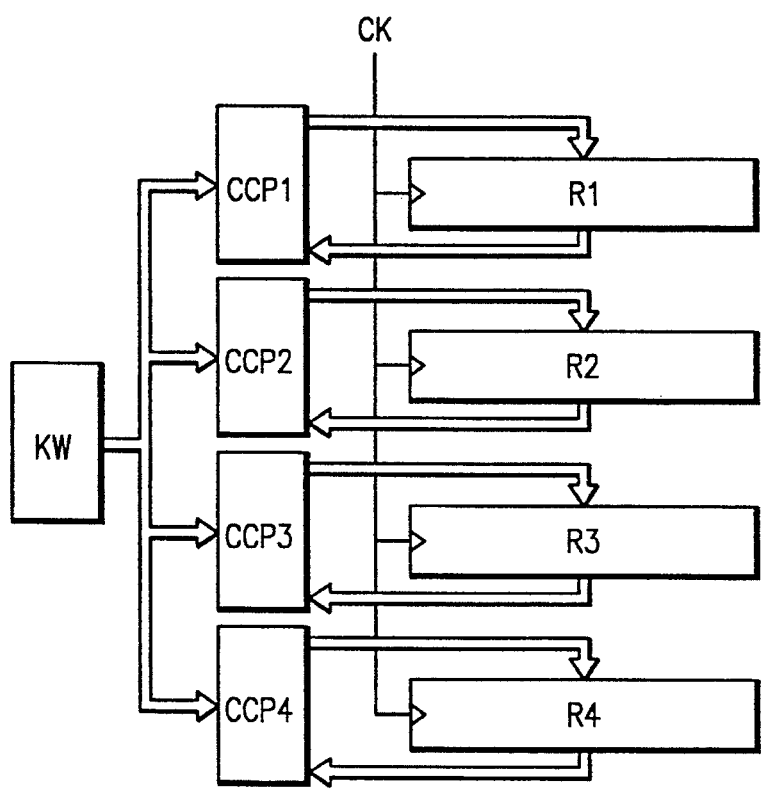

To shorten this loading process, this is done in parallel mode with an equivalent serial shift of 16 bits, as shown in FIG. 2, by applying the following expressions:

$R1_{n+16} = R1_n \times (T1)^{16} + U1'_n$;

$R2_{n+16} = R2_n \times (T2)^{16} + U2'_n$;

$R3_{n+16} = R3_n \times (T3)^{16} + U3'_n$;

$R4_{n+16} = R4_n \times (T4)^{16} + U4'_n$;

where the new values $R1_{n+16}$, $R2_{n+16}$, $R3_{n+16}$ and $R4_{n+16}$ of the registers are, respectively, those they will have after 16 clock cycles in serial loading mode in accordance with the preceding expressions. $(Ti)^{16}$ are the corresponding transfer matrices of each generator polynomial but raised to the 16th power and, finally, $U1'_n$, $U2'_n$, $U3'_n$ and $U4'_n$, are the input vectors formed by the same number of consecutive bits of the keyword as is the length of the corresponding register and in which its content is progressively shifted by 16 bits at the moment of each calculation.

Each shift register has associated with it, a corresponding parallel load calculation circuit CCP1, CCP2, CCP3 and CCP4 which executes each of the expressions indicated above for which is also required the current content of the corresponding shift registers $R1_n$, $R2_n$, $R3_n$ and $R4_n$ and the keyword stored in the corresponding keyword register KW and which in this case employs a parallel instead of a serial access, using for this the data clock CK.

In this way the loading of the keyword in the four registers is done in only 8 clock cycles whereby, even though the logic design complexity is much greater, it is possible to use the data clock because the total time is not increased. In addition, since the loading process takes place at sufficiently spaced periods of time, the increase in current consumption resulting from this greater complexity is not significant.

Once the loading of the keyword into the registers has been done, the pre-ciphering starts; this, as defined in the algorithm, would consist of disconnecting the input to the four registers and performing 40 shift cycles of the four registers R1, R2, R3 and R4 in which, in each cycle, a shift of 2 or 3 bits occurs in the first three registers R1, R2 and R3, depending on certain logic functions of some of the bits in these same registers, and a shift that is always 3 bits occurs in the fourth register R4. There is also an intermediate check in cycle number 11 of the state of the registers so that, in the event that the content of one of them is all zeros, a one can be set at its input.

Figure 3:
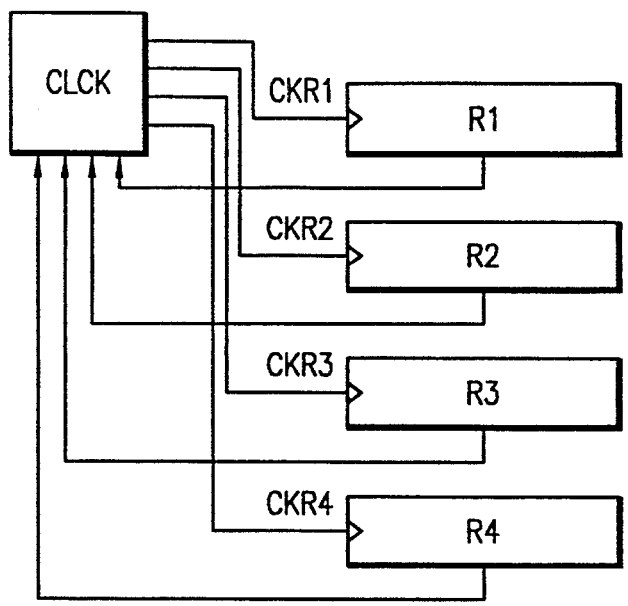
FIG. 3 shows a block diagram for the pre-ciphering and ciphering processes according to the state of the art, and FIGS. 4 and 5 respectively are block diagrams of the pre-ciphering and ciphering processes according to the invention.

FIG. 3 shows how a pre-ciphering would be done according to a serial procedure as defined in the standard. In this figure it can be seen how there is no input to the shift registers, there is only their own intermediate feedback signals (not shown) according to the polynomials they implement to determine the new value of the first input bit of each register.

Taking the data clock as a possible reference, for each cycle of this clock 2 or 3 shifts have to be made of the information contained in the bistables incorporated in the corresponding registers R1, R2, R3, and always three in R4. In accordance with the figure, this is done so that register R4 receives a clock CKR4 that is three times faster than that which is taken as reference, while the clocks for the other three registers CKR1, CKR2 and CKR3 can be two or three times the reference, depending on logic functions of certain bits of each of the corresponding registers as is defined in the ciphering standard. This is done in a clock logic circuit CLCK.

Figure 4:
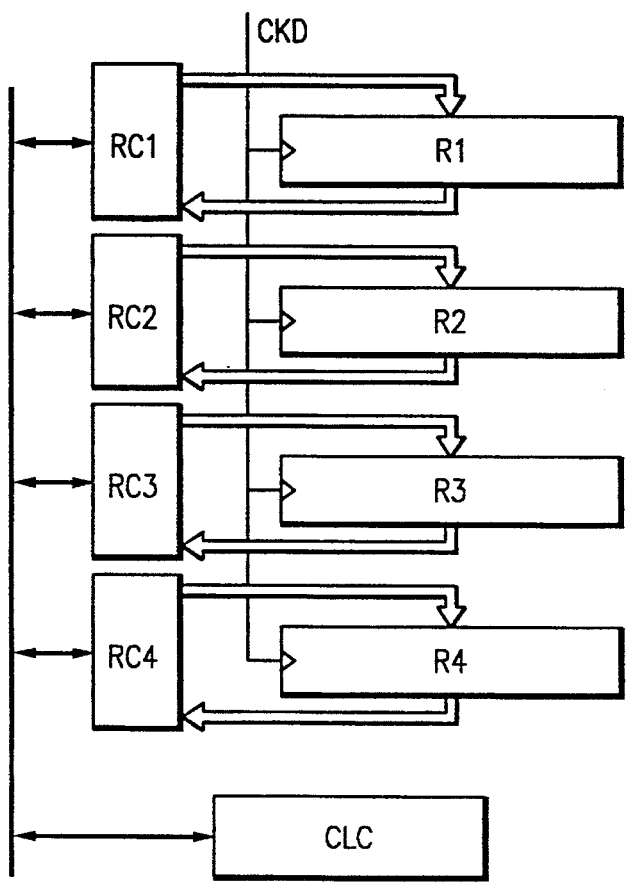

In this stage, in accordance with the device of the invention as shown in FIG. 4, shifts are made in two consecutive cycles in parallel mode in the same form as in the keyword loading process, and in which each one of these cycles is equivalent to serial shifts of 2 or of 3 bits; in other terms:

$$R1_{n+m1}=R1_n \times (T1)^{m1}+U1'_n;$$

$$R2_{n+m2}=R2_n \times (T2)^{m2}+U2'_n;$$

$$R3_{n+m3}=R3_n \times (T3)^{m3}+U3'_n;$$

$$R4_{n+3}=R4_n \times (T4)^3+U4'_n;$$

where m1, m2, m3 can have the value 2 or 3 depending on the intermediate values of the corresponding registers.

In order to accomplish this storage the corresponding combinational shift circuits RC1, RC2, RC3 and RC4. First obtain the value of the equivalent serial shift for the first cycle in each of these registers. Afterwards the calculations are made to obtain, for each register, the number of bits that determine the shift for the second cycle, whereby the equivalent serial shifts for two consecutive cycles are obtained and which, consequently, can be 4, 5 or 6 bits for the first three registers R1, R2 and R3, and always 6 for the fourth register. This whole process is done under the control of a control logic circuit CLC which sends to each of the combinational shift circuits RC1, RC2, RC3 and RC4 the bits coming from the rest of the registers that are needed for it to execute its function.

Once the net shift values have been obtained in the two cycles mentioned, always in accordance with the expressions stated above for calculations in the parallel shift registers, new calculations are performed, but using this time the new shift values obtained from two consecutive cycles, namely 4, 5 or 6.

This whole process is done in a single data clock cycle, whereby, in 20 clock cycles it is possible to carry out the process requiring 120 clock cycles in a serial implementation.

Finally the third phase is input data bit ciphering. For this the same function is employed as in the pre-ciphering phase but this time the reference clock has to be necessarily the data clock CKD, so that from an out-put logic circuit S an output ciphering bit BCS is obtained by means of logical combinations of certain bits from three of the four shift registers and a memory bit BM that is the actual output ciphering bit BCS in the preceding data clock period. The output ciphering bit BCS is applied to an exclusive-OR logic gate for combining with the input data D, so that, at the output of this gate, the ciphered output data DC are finally obtained.

Figure 5:
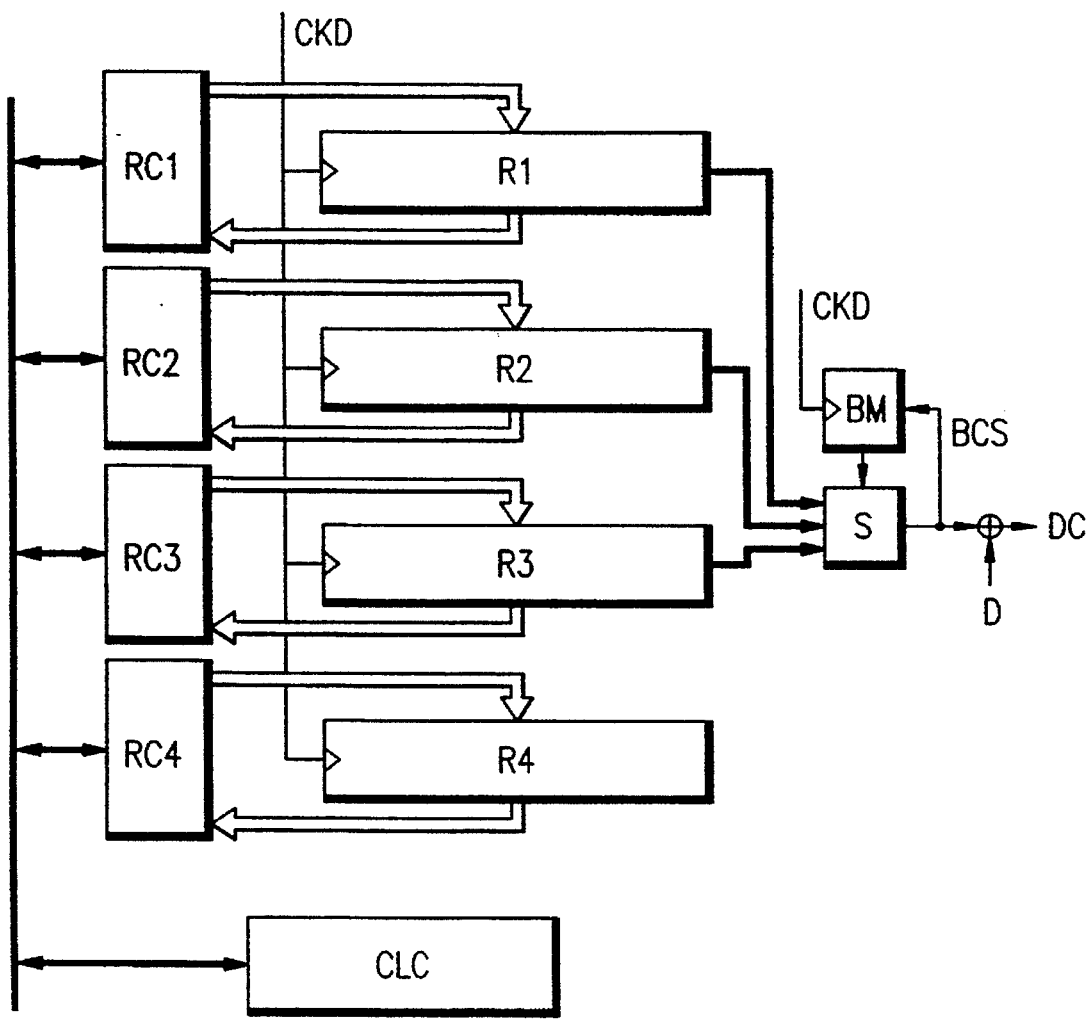

This is done, as shown in FIG. 5 according to the invention, in a very similar way to that of the pre-ciphering, but on this occasion there is only one shift cycle that is done directly in parallel at a cadence defined by the data clock CKD.

What is claimed is:

1. A data ciphering device comprising a number of shift registers (R1, R2, R3, R4), each having a respective plurality of bistables, each performing a variable number of shifts for each data period and providing respective intermediate feedback signals, the data ciphering device providing an output bit (DC) from a logical combination of some bits of the shift registers (R1, R2, R3, R4), the data ciphering device receiving an associated data clock signal (CKD), the data ciphering device having:

means for performing a loading process where the shift registers (R1, R2, R3, R4) are loaded with a keyword contained in a keyword register (KW), means for performing a pre-ciphering process, and means for performing a ciphering process; said output bit (DC) being combined with an actual information bit (D) to be ciphered, wherein all of the shift registers R1, R2, R3, R4) and the respective plurality of bistables operate with a cadence that is determined by the frequency of the associated data clock signal (CKD).

2. A device according to claim 1, wherein the means for performing the loading process of the shift registers (R1, R2, R3, R4) with the keyword contained in the keyword register (KW) takes place in a parallel mode by means of corresponding parallel load calculating circuits (CCP1, CCP2, CCP3, CCP4) that respond respectively to the following expressions:

$$R1_{n+p}=R1_n \times (T1)^P+U1'_n;$$

$$R2_{n+p}=R2_n \times (T2)^P+U2'_n;$$

$$R3_{n+p}=R3_n \times (T3)^P+U3'_n;$$

$$R4_{n+p}=R4_n \times (T4)^P+U4'_n;$$

where, $R1_{n+p}$, $R2_{n+p}$, $R3_{n+p}$ and $R4_{n+p}$ are new values the shift registers (R1, R2, R3, R4) would have after p clock cycles in a serial load mode, transfer matrices $(T1)^P$, $(T2)^P$, $(T3)^P$ and $(T4)^P$ correspond to each generating polynomial but raised to a power p, and input vectors $U1'_n$, $U2'_n$, $U3'_n$ and $U4'_n$, each having a corresponding length of a respective shift register (R1, R2, R3, R4) and being formed by the same number of consecutive bits of the keyword and being shifted p bits by each clock cycle.

3. A device according to claim 2, wherein the means for loading the keyword is done with equivalent shifts, p, of 16 bits.

4. A device according to claim 1, wherein the means for performing the pre-ciphering process includes corresponding parallel shift combinational circuits (RC1, RC2, C3, RC4) for making, in a first cycle, a calculation in parallel mode of the valve of bits in the shift registers (R1, R2, R3, R4) that permits the value of a next shift to be determined and, for making, in a second cycle, starting with previous values in the shift registers (R1, R2, R3, R4) and also in a parallel mode, a serial shift that is equivalent to a sum of two consecutive shift values obtained previously.

5. A device according to claim 1, wherein the means for performing the ciphering process includes an output circuit (S) for performing a logical function, which is subsequently combined in an exclusive-OR gate with input data (D) in order to obtain a ciphered output data signal (DC), and also includes individual parallel shift combinational circuits (RC1, RC2, RC3, RC4) for performing an equivalent serial shift of the shift registers (R1, R2, R3, R4) in parallel mode and in a single clock cycle corresponding to the value obtained according to an algorithm.

\* \* \* \* \*